(12) United States Patent
Hindy et al.

(10) Patent No.: US 12,494,837 B2
(45) Date of Patent: Dec. 9, 2025

(54) CHANNEL STATE INFORMATION REPORTING FOR MULTIPLE TRANSMIT/RECEIVE POINTS

(71) Applicant: Lenovo (Singapore) Pte. Ltd., New Tech Park (SG)

(72) Inventors: Ahmed Monier Ibrahim Saleh Hindy, Forest Park, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 291 days.

(21) Appl. No.: 18/017,625

(22) PCT Filed: Jul. 21, 2021

(86) PCT No.: PCT/IB2021/056611
§ 371 (c)(1),
(2) Date: Jan. 23, 2023

(87) PCT Pub. No.: WO2022/018672
PCT Pub. Date: Jan. 27, 2022

(65) Prior Publication Data
US 2023/0327727 A1    Oct. 12, 2023

Related U.S. Application Data

(60) Provisional application No. 63/054,702, filed on Jul. 21, 2020.

(51) Int. Cl.
*H04B 7/06* (2006.01)
*H04L 5/00* (2006.01)

(52) U.S. Cl.
CPC ....... *H04B 7/06952* (2023.05); *H04B 7/0626* (2013.01); *H04L 5/0051* (2013.01)

(58) Field of Classification Search
None
See application file for complete search history.

(56) References Cited

U.S. PATENT DOCUMENTS

| 2019/0260448 A1* | 8/2019 | Rahman | H04B 7/0626 |
| 2019/0297603 A1* | 9/2019 | Guo | H04L 5/0053 |

(Continued)

FOREIGN PATENT DOCUMENTS

| WO | 2019237339 A1 | 12/2019 |
| WO | 2020056708 A1 | 3/2020 |

OTHER PUBLICATIONS

PCT/IB2021/056611, "Notification of Transmittal of the International Search Report and the Written Opinion of the International Searching Authority, or the Declaration", International Searching Authority, Oct. 25, 2021, pp. 1-11.

(Continued)

*Primary Examiner* — Otis L Thompson, Jr.
(74) *Attorney, Agent, or Firm* — Kunzler Bean & Adamson

(57) ABSTRACT

Apparatuses, methods, and systems are disclosed for channel state information reporting for multiple transmit/receive points. One apparatus includes a transceiver that receives an indication from a mobile wireless communication net-work that channel state information ("CSI") corresponding to multiple transmit/receives points ("TRPs") is to be reported and a processor that generates at least one CSI report according to the CSI reporting configuration, the at least one CSI report comprising a CSI-reference signal ("CSI-RS") resource indicator ("CRI"), wherein the transceiver reports the at least one CSI report comprising the CRI to the mobile wireless communication network.

20 Claims, 11 Drawing Sheets

(56) References Cited

U.S. PATENT DOCUMENTS

| | | | | |
|---|---|---|---|---|
| 2019/0379506 | A1* | 12/2019 | Cheng | H04W 88/06 |
| 2020/0076490 | A1 | 3/2020 | Onggosanusi et al. | |
| 2020/0084006 | A1* | 3/2020 | Rahman | H04W 72/23 |
| 2020/0127786 | A1* | 4/2020 | Kwak | H04W 72/23 |
| 2020/0350967 | A1* | 11/2020 | Xu | H04B 7/022 |
| 2021/0144722 | A1* | 5/2021 | Yang | H04L 25/0226 |
| 2021/0203397 | A1* | 7/2021 | Xiong | H04W 72/23 |
| 2021/0226680 | A1* | 7/2021 | Khoshnevisan | H04B 7/0404 |
| 2021/0328644 | A1* | 10/2021 | Hao | H04B 7/0639 |
| 2023/0025326 | A1* | 1/2023 | Karjalainen | H04B 7/063 |
| 2023/0056106 | A1* | 2/2023 | Hao | H04L 5/0057 |
| 2023/0061722 | A1* | 3/2023 | Hao | H04B 7/048 |
| 2023/0088818 | A1* | 3/2023 | Chou | H04B 7/0469 370/329 |

OTHER PUBLICATIONS

Samsung et al., "WF on Type I and II CSI codebooks", 3GPP TSG-RAN WG1 #89 R1-1709232, May 15-19, 2017, pp. 1-24.

Huawei et al., "CSI measurement enhancement for multi-TRP/panel transmission", 3GPP TSG RAN WG1 Meeting #97 R1-1906038, May 13-17, 2019, pp. 1-4.

LG Electronics, "Discussion on CSI enhancement for NCJT", 3GPP TSG RAN WG1 #97 R1-1906736, May 13-17, 2019, pp. 1-3.

Ericsson, "Views on CSI framework for multi-TRP", 3GPP TSG RAN WG1 Meeting #97 R1-1907424, May 13-17, 2019, pp. 1-2.

Spreadtrum Communications, "Discussion on CSI enhancement for multiple TRP/Panel transmission", 3GPP TSG RAN WG1 #98 R1-1908961, Aug. 26-30, 2019, pp. 1-4.

3GPP, "3rd Generation Partnership Project; Technical Specification Group Radio Access Network; NR; Physical channels and modulation (Release 16)", 3GPP TS 38.211 V16.1.0, Mar. 2020, pp. 1-130.

3GPP, "3rd Generation Partnership Project; Technical Specification Group Radio Access Network; NR; Multiplexing and channel coding (Release 16)", 3GPP TS 38.212 V16.1.0, Mar. 2020, pp. 1-146.

3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.

* cited by examiner

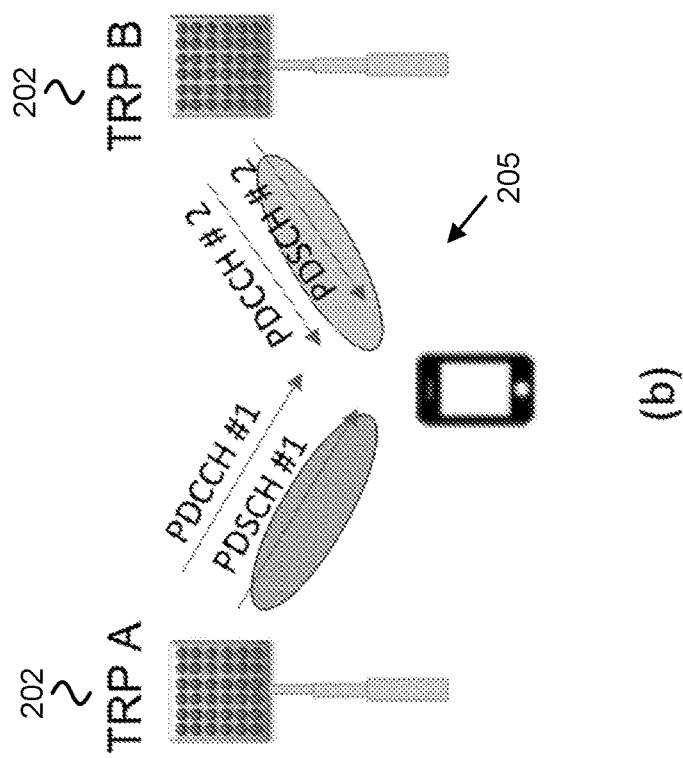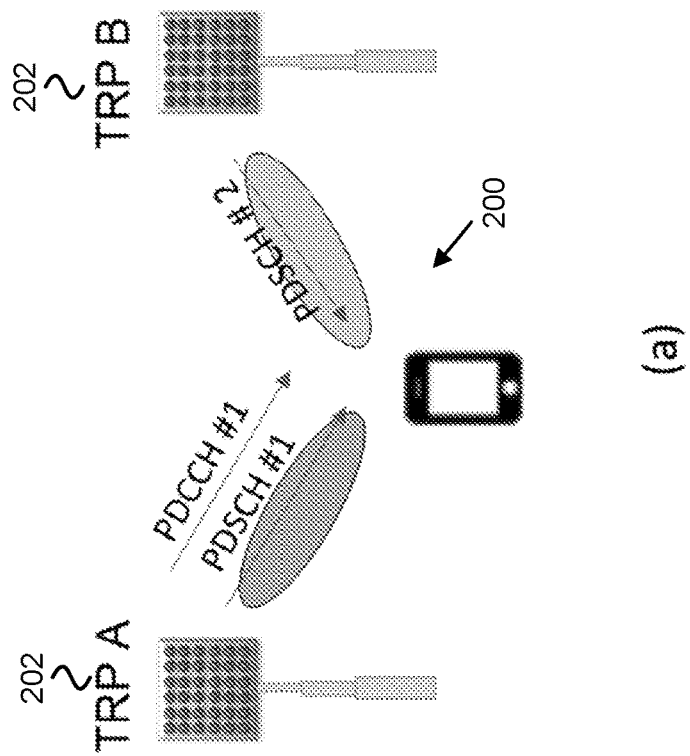
FIG. 2

500

```
CSI-AperiodicTriggerState ::= SEQUENCE {
        associatedReportConfigInfoList      SEQUENCE (SIZE(1..maxNrofReportConfigPerAperiodicTrigger))
                                                OF CSI-AssociatedReportConfigInfo,
        . . .
}

CSI-AssociatedReportConfigInfo ::= SEQUENCE {
        reportConfigId                      CSI-ReportConfigId,
        resourcesForChannel                 CHOICE{
            nzp-CSI-RS SEQUENCE {
                resourceSet                 INTEGER (1..maxNrofNZP-CSI-ResourceSetsPerConfig),
                qcl-info                    SEQUENCE (SIZE(1..maxNrofAP-CSI-RS-ResourcesPerSet))
                                                OF TCI-StateId OPTIONAL – Cond Aperiodic
            },
            csi-SSB-ResourceSet             INTEGER (1..maxNrofCSI-SSB-ResourceSetsPerConfig)
        },
        csi-IM-ResourcesForInterference     INTEGER(1..maxNrofCSI-IM-ResourceSetsPerConfig),
        nzp-CSI-RS-ResourcesForInterference INTEGER (1..maxNrofNZP-CSI-RS-ResourceSetsPerConfig)
        . . .
}
```

```
NZP-CSI-RS-Resource ::= SEQUENCE {
        nzp-CSI-RS-ResourceId    NZP-CSI-RS-ResourceId,
        resourceMapping          CSI-RS-ResourceMapping,
        powerControlOffset       INTEGER (-8..15),
        powerControlOffsetSS     ENUMERATED{db-3, db0, db3, db6} OPTIONAL, -- Need R
        scramblingID             ScramblingId,
        periodicityAndOffset     CSI-ResourcePeriodicityAndOffset OPTIONAL, -
        qcl-InfoPeriodicCSI-RS   TCI-StateId OPTIONAL, -- Cond Periodic
        . . .
}
```

```
CSI-IM-Resource ::= SEQUENCE {
        csi-IM-ResourceId                CSI-IM-ResourceId,
        csi-IM-ResourceElementPattern    CHOICE {
            pattern0 SEQUENCE {
                subcarrierLocation-p0    ENUMERATED { s0, s2, s4, s6, s8, s10 },
                symbolLocation-p0        INTEGER (0..12)
            },
            pattern1 SEQUENCE {
                subcarrierLocation-p1    ENUMERATED { s0, s4, s8 },
                symbolLocation-p1        INTEGER (0..13)
            }
        } OPTIONAL, -- Need M
        freqBand                         CSI-FrequencyOccupation OPTIONAL,
        periodicityAndOffset             CSI-ResourcePeriodicityAndOffset OPTIONAL,
        PeriodicOrSemiPersistent
. . .
}
```

CHANNEL STATE INFORMATION REPORTING FOR MULTIPLE TRANSMIT/RECEIVE POINTS

CROSS-REFERENCE TO RELATED APPLICATIONS

This application claims priority to U.S. Provisional Patent Application No. 63/054,702 entitled "CSI REPORTING ENHANCEMENTS FOR MULTI-TRP/PANEL TRANSMISSION FOR NR FREQUENCY RANGES" and filed on Jul. 21, 2020, for Ahmed Monier Ibrahim Saleh Hindy, et al., which is incorporated herein by reference.

FIELD

The subject matter disclosed herein relates generally to wireless communications and more particularly relates to channel state information reporting for multiple transmit/receive points.

BACKGROUND

In certain wireless communication systems, a User Equipment device ("UE") is able to connect with a fifth-generation ("5G") core network (i.e., "5GC") in a Public Land Mobile Network ("PLMN"). In wireless networks, channel state information may be transmitted between a UE and a wireless network.

BRIEF SUMMARY

Disclosed are procedures for channel state information reporting for multiple transmit/receive points. Said procedures may be implemented by apparatus, systems, methods, and/or computer program products.

An apparatus, in one embodiment, includes a transceiver that receives an indication from a mobile wireless communication network that channel state information ("CSI") corresponding to multiple transmit/receives points ("TRPs") is to be reported. The multiple TRPs may correspond to a transmission configuration comprising multiple transmission configuration indicator ("TCI") states. The indication may indicate a CSI reporting configuration. In one embodiment, the apparatus includes a processor that generates at least one CSI report according to the CSI reporting configuration, the at least one CSI report comprising a CSI-reference signal ("CSI-RS") resource indicator ("CRI"). In further embodiments, the transceiver reports the at least one CSI report comprising the CRI to the mobile wireless communication network.

In one embodiment, a method includes receiving, at a user equipment ("UE") device, an indication from a mobile wireless communication network that channel state information ("CSI") corresponding to multiple transmit/receive points ("TRPs") is to be reported. The multiple TRPs may correspond to a transmission configuration comprising multiple transmission configuration indicator ("TCI") states. The indication may indicate a CSI reporting configuration. In one embodiment, the method includes generating at least one CSI report according to the CSI reporting configuration, the at least one CSI report comprising a CSI-reference signal ("CSI-RS") resource indicator ("CRI"). IN certain embodiments, the first method includes reporting the at least one CSI report comprising the CRI to the mobile wireless communication network.

In one embodiment, an apparatus includes a transceiver that sends, to a user equipment ("UE") device, an indication that channel state information ("CSI") corresponding to multiple transmit/receives points ("TRPs") is to be reported. The multiple TRPs may correspond to a transmission configuration comprising multiple transmission configuration indicator ("TCI") states. The indication may indicate a CSI reporting configuration. In one embodiment, the transceiver receives at least one CSI report from the UE corresponding to one or more of the multiple TRPs, the CSI report generated according to the CSI reporting configuration, the at least one CSI report comprising a CSI-reference signal ("CSI-RS") resource indicator ("CRI").

In one embodiment, a method includes sending, to a user equipment ("UE") device, an indication that channel state information ("CSI") corresponding to multiple transmit/receives points ("TRPs") is to be reported. The multiple TRPs may correspond to a transmission configuration comprising multiple transmission configuration indicator ("TCI") states. The indication may indicate a CSI reporting configuration. In one embodiment, the method includes receiving at least one CSI report from the UE corresponding to one or more of the multiple TRPs, the CSI report generated according to the CSI reporting configuration, the at least one CSI report comprising a CSI-reference signal ("CSI-RS") resource indicator ("CRI").

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a diagram illustrating embodiments of a system for channel state information reporting for multiple transmit/receive points;

FIG. 5 is a code sample illustrating one embodiment of the process by which an aperiodic trigger state indicates a resource set and QCL information for channel state information reporting for multiple transmit/receive points;

FIG. 6 is a code sample illustrating one embodiment of an RRC configuration including an NZP-CSI-RS resource and a CSI-IM-resource for channel state information reporting for multiple transmit/receive points;

DETAILED DESCRIPTION

Figure 1:
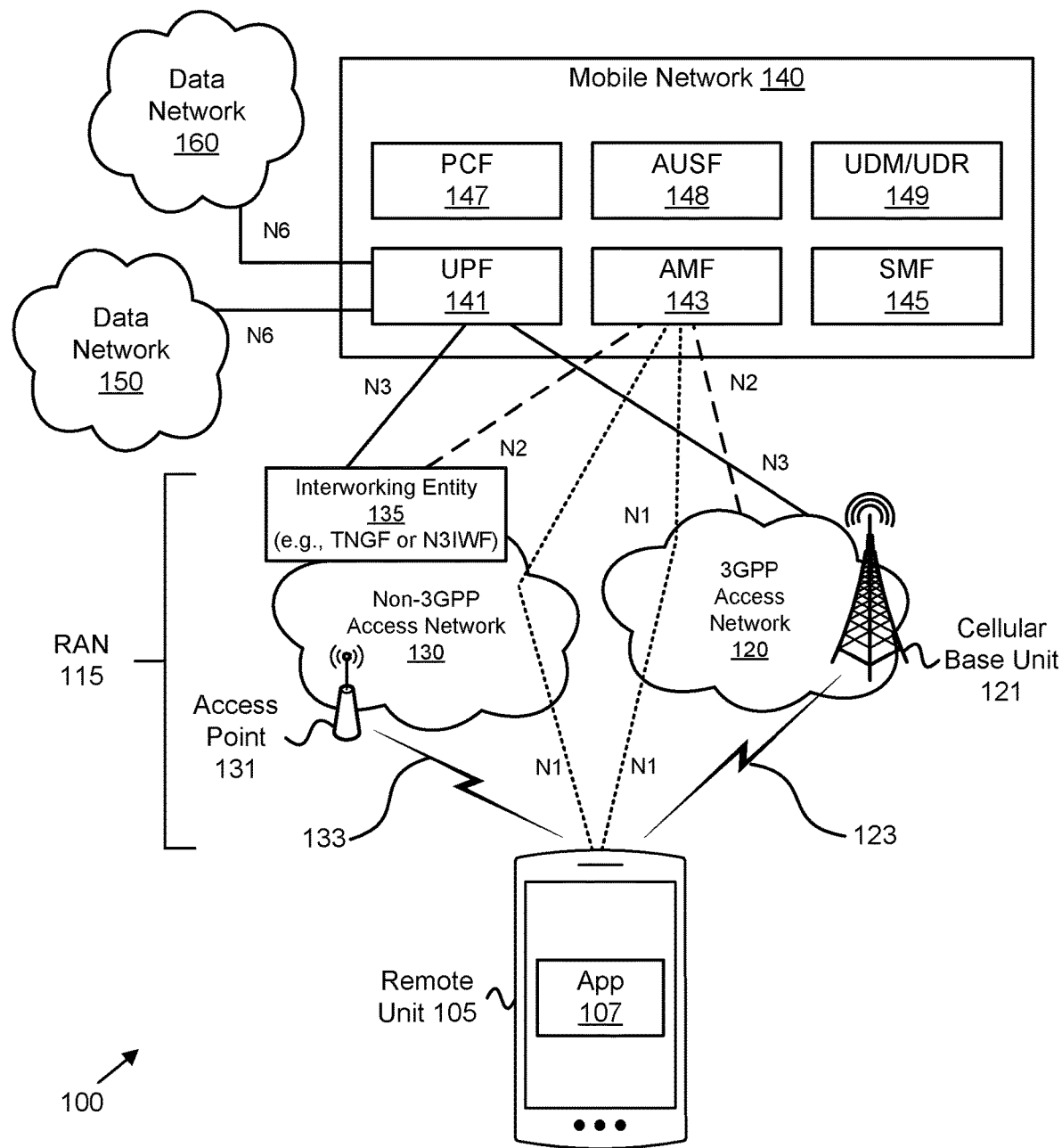
FIG. 1 is a schematic block diagram illustrating one embodiment of a wireless communication system for channel state information reporting for multiple transmit/receive points.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof"

includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for channel state information reporting for multiple transmit/receive points. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

For 3GPP NR, multiple transmit/receive points ("TRPS") or multiple antenna panels within a TRP may communicate simultaneously with one user equipment (UE) to enhance coverage, throughput, or reliability. This may come at the expense of excessive control signaling between the network side and the UE side, so as to communicate the best transmission configuration, e.g., whether to support multi-point transmission, and if so, which TRPs would operate simultaneously, in addition to a possibly super-linear increase in the amount of channel state information ("CSI") feedback reported from the UE to the network, since a distinct report may be needed for each transmission configuration. For NR Type-II codebook with high resolution, the number of Precoding Matrix Indicator ("PMI") bits fed back from the UE in the gNB via uplink control information ("UCI") can be very large (>1000 bits at large bandwidth), even for a single-point transmission. Thereby, reducing the number of PMI feedback bits per report is crucial to improve efficiency.

FIG. 1 depicts a wireless communication system 100 for channel state information reporting for multiple transmit/receive points, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art.

The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As discussed above, in one embodiment, for 3GPP NR, multiple transmit/receive points ("TRPS") or multiple antenna panels within a TRP may communicate simultaneously with one user equipment ("UE") to enhance coverage, throughput, or reliability. This may come at the expense of excessive control signaling between the network side and the UE side, so as to communicate the best transmission configuration, e.g., whether to support multi-point transmission, and if so, which TRPs would operate simultaneously, in addition to a possibly super-linear increase in the amount of channel state information ("CSI") feedback reported from the UE to the network, since a distinct report may be needed for each transmission configuration. For NR Type-II codebook with high resolution, the number of Precoding Matrix Indicator ("PMI") bits fed back from the UE in the gNB via uplink control information ("UCI") can be very large (>1000 bits at large bandwidth), even for a single-point transmission. Thereby, reducing the number of PMI feedback bits per report is crucial to improve efficiency.

The multiple input/multiple output ("MIMO") enhancements in one embodiment, in NR MIMO work item included multi-TRP and multi-panel transmissions. The purpose of multi-TRP transmission, in one embodiment, is to improve the spectral efficiency, as well as the reliability and robustness of the connection in different scenarios, and it covers both ideal and nonideal backhaul.

For increasing the spectral efficiency using multi-TRP, in one embodiment, non-coherent joint transmission ("NCJT") may be used. Unlike coherent joint transmission that requires tight synchronization between the TRPs and a high CSI accuracy for precoding design, NCJT requires that each TRP 202 transmits different layers of the same codeword (e.g., single scheduling DCI—two PDSCH transmission, as shown in part (a) 200) or the layers corresponding to a single codeword (e.g., two-scheduling DCIs—two PDSCH transmission, as shown in part (b) 205), as depicted in FIG. 2.

Figure 3:
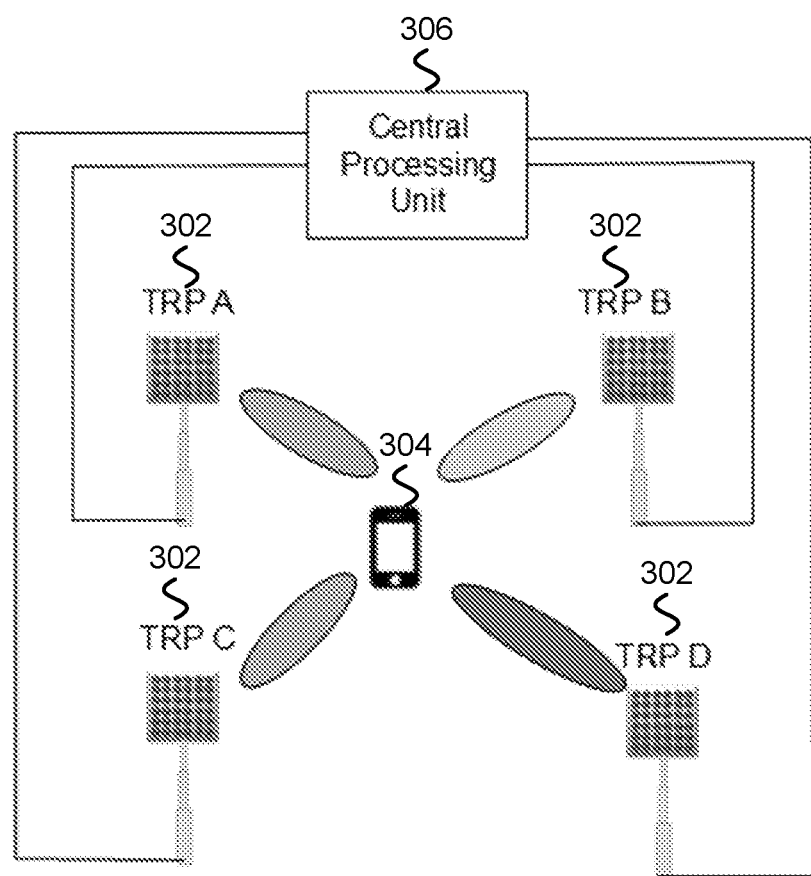
FIG. 3 is a diagram illustrating one embodiment of multiple transmit/receive points in a coordination cluster connected to a central processing unit.

In one embodiment, NCJT supports a maximum of two TRP joint transmissions. Nonetheless, the UE 304 may be served by multiple TRPs 302 forming a coordination cluster, possibly connected to a central processing unit 306, as shown in FIG. 3.

In one scenario, a UE can be dynamically scheduled to be served by one of multiple TRPs in the cluster (baseline Rel-15 NR scheme). The network can also pick two TRPs to perform joint transmission. In either case, the UE needs to report the needed CSI information for the network for it to decide the multi-TRP downlink transmission scheme.

However, in one embodiment, the number of transmission hypotheses increases exponentially with number of TRPs in the coordination cluster. For example, for 4 TRPs, you have 10 transmission hypotheses: (TRP 1), (TRP 2), (TRP 3), (TRP 4), (TRP 1, TRP 2), (TRP 1, TRP 3), (TRP 1, TRP 4), (TRP 2, TRP 3), (TRP 2, TRP 4), and (TRP 3, TRP 4). The overhead from reporting will increase dramatically with the size of the coordination cluster.

Moreover, in one embodiment, the uplink transmission resources on which the CSI reports are transmitted might not be enough, and partial CSI omission might be necessary as the case in Rel-16. Currently CSI reports are prioritized according to:
- time-domain behavior and physical channel, where more dynamic reports are given precedence over less dynamic reports and physical uplink shared channel ("PUSCH") has precedence over physical uplink control channel ("PUCCH").
- CSI content, where beam reports (i.e. L1-RSRP reporting) has priority over regular CSI reports.
- the serving cell to which the CSI corresponds (in case of CA operation). CSI corresponding to the PCell has priority over CSI corresponding to Scells.
- the reportConfigID.

This ordering, in one embodiment, does not consider that some multi-TRP NCJT transmission hypotheses, as measured by the UE, will achieve low spectral efficiency performance and should be given a lower priority.

The subject matter disclosed herein, in one embodiment, for the purpose of multi-TRP NCJT physical downlink shared channel ("PDSCH") transmission, enables the UE to:
- reduce the CSI reporting overhead without degrading performance,
- modify partial CSI omission priorities to favor multi-TRP transmission hypotheses with higher spectral efficiency.

Further, in one embodiment, the disclosure aims at providing smart techniques for CSI feedback reporting, such that different reports corresponding to different transmission configurations are jointly designed so as to reduce the overall CSI feedback overhead for multi-TRP/Panel transmission.

Regarding NR Type-II Codebook, in one embodiment, assume the gNB is equipped with a two-dimensional (2D) antenna array with $N_1$, $N_2$ antenna ports per polarization placed horizontally and vertically and communication occurs over $N_3$ PMI sub-bands. A PMI subband consists of a set of resource blocks, each resource block consisting of a set of subcarriers. In such case, $2N_1N_2$ CSI-reference signal ("RS") ports are utilized to enable DL channel estimation with high resolution for NR Type-II codebook. In order to reduce the UL feedback overhead, a Discrete Fourier transform (DFT)-based CSI compression of the spatial domain is applied to L dimensions per polarization, where $L<N_1N_2$. The magnitude and phase values of the linear combination coefficients for each sub-band are fed back to the gNB as part of the CSI report. The $2N_1N_2 \times N_3$ codebook per layer takes on the form $$W = W_1 W_2$$

where $W_1$ is a $2N_1N_2 \times 2L$ block-diagonal matrix ($L<N_1N_2$) with two identical diagonal blocks, i.e., $$W_1 = \begin{bmatrix} B & 0 \\ 0 & B \end{bmatrix},$$

and B is an $N_1N_2 \times L$ matrix with columns drawn from a 2D oversampled DFT matrix, as follows.

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix},$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T,$$

$$B = \begin{bmatrix} v_{l_0,m_0} & v_{l_1,m_1} & \cdots & v_{l_{L-1},m_{L-1}} \end{bmatrix},$$

$$l_i = O_1 n_1^{(i)} + q_1, \ 0 \le n_1^{(i)} < N_1, \ 0 \le q_1 < O_1 - 1,$$

$$m_i = O_2 n_2^{(i)} + q_2, \ 0 \le n_2^{(i)} < N_2, \ 0 \le q_2 < O_2 - 1,$$

where the superscript $^T$ denotes a matrix transposition operation. Note that $O_1 O_2$ oversampling factors are assumed for the 2D DFT matrix from which matrix B is drawn. Note that $W_1$ is common across all layers. $W_2$ is a $2L \times N_3$ matrix, where the $i^{th}$ column corresponds to the linear combination coefficients of the 2L beams in the $i^{th}$ sub-band. Only the indices of the L selected columns of B are reported, along with the oversampling index taking on $O_1 O_2$ values. Note that $W_2$ are independent for different layers.

Regarding NR Type-II Codebook, in one embodiment, frequency compression is applied in conjunction with spatial compression. In addition to the spatial compression of Type-II codebook, an Inverse Discrete Fourier transform (IDFT)-based CSI compression in the frequency domain is applied, where each beam of the frequency-domain precoding vectors is transformed using an inverse DFT matrix to the delay domain, and the magnitude and phase values of a subset of the delay-domain coefficients are selected and fed back to the gong as part of the CSI report. The $2N_1N_2 \times N_3$ codebook per layer takes on the form $$W = W_1 \tilde{W}_2 W_f^H,$$

where $W_1$ follows the same design and reporting framework as in Type-II codebook. $W_f$ is an $N_3 \times M$ matrix ($M<N_3$) with columns selected from a critically-sampled size-$N_3$ DFT matrix, as follows $$W_f = \begin{bmatrix} f_{k_0} & f_{k_1} & \cdots & f_{k_{M-1}} \end{bmatrix}, \ 0 \le k_i < N_3 - 1,$$

$$f_k = \begin{bmatrix} 1 & e^{-j\frac{2\pi k}{N_3}} & \cdots & e^{-j\frac{2\pi k(N_3-1)}{N_3}} \end{bmatrix}^T$$

For $W_f$, in one embodiment, only the indices of the M selected columns out of the predefined size-$N_3$ DFT matrix are reported. Hence, L, M represent the equivalent spatial and frequency dimensions after compression, respectively. Finally, the $2L \times M$ matrix $\tilde{W}_2$ represents the linear combination coefficients (LCCs) of the spatial and frequency DFT-basis vectors. Both are $\tilde{W}_2$ and $W_f$ and independent for different layers. Magnitude and phase values of an approximately $\beta$ fraction of the 2LM available coefficients are reported to the gNB ($\beta<1$) as part of the CSI report. In one embodiment, coefficients with zero magnitude are indicated via a per-layer bitmap. Since all coefficients reported within a layer are normalized with respect to the coefficient with the largest magnitude (strongest coefficient), the relative value of that coefficient is set to unity, and no magnitude or phase information is explicitly reported for this coefficient. Only an indication of the index of the strongest coefficient per layer is reported Hence, for a single-layer transmission, magnitude and phase values of a maximum of $[2\beta LM]-1$ coefficients (along with the indices of selected L, M DFT vectors) are reported per layer, leading to significant reduction in CSI report size, compared with reporting $2N_1N_2 \times N_3-1$ coefficients' information.

For Type-II Port Selection codebook, in one embodiment, only K (where $K \le 2N_1N_2$) beamformed CSI-RS ports are utilized in DL transmission, in order to reduce complexity. The. The $K \times N_3$ codebook matrix per layer takes on the form $$W = W_1^{PS} \tilde{W}_2 W_f^H.$$

Here, $\tilde{W}_2$ and $W_3$ follow the same structure as the conventional NR Type-II Codebook, and are layer specific. $W_1$ is a $K \times 2L$ block-diagonal matrix with two identical diagonal blocks, i.e., $$W_1^{PS} = \begin{bmatrix} E & 0 \\ 0 & E \end{bmatrix},$$

and E is an $$\frac{K}{2} \times L$$

matrix whose columns are standard unit vectors, as follows.

$$E = \begin{bmatrix} e_{mod(m_{PS}d_{PS}, K/2)}^{(K/2)} & e_{mod(m_{PS}d_{PS}+1, K/2)}^{(K/2)} & \cdots & e_{mod(m_{PS}d_{PS}+L-1, K/2)}^{(K/2)} \end{bmatrix},$$

where $e_i^{(K)}$ is a standard unit vector with a 1 at the $i^{th}$ location. Here $d_{PS}$ is an RRC parameter which takes on the values $\{1, 2, 3, 4\}$ under the condition $d_{PS} \le \min(K/2, L)$, whereas $m_{PS}$ takes on the values $$\left\{ 0, \ldots, \left\lceil \frac{K}{2d_{PS}} \right\rceil - 1 \right\}$$

and is reported as part of the UL CSI feedback overhead. $W_1$ is common across all layers.

For K=16, L=4 and $d_{PS}$=1, the 8 possible realizations of E corresponding to $m_{PS}$={0, 1, . . . , 7} are as follows $$\begin{bmatrix}1&0&0&0\\0&1&0&0\\0&0&1&0\\0&0&0&1\\0&0&0&0\\0&0&0&0\\0&0&0&0\\0&0&0&0\end{bmatrix}\begin{bmatrix}0&0&0&0\\1&0&0&0\\0&1&0&0\\0&0&1&0\\0&0&0&1\\0&0&0&0\\0&0&0&0\\0&0&0&0\end{bmatrix}\begin{bmatrix}0&0&0&0\\0&0&0&0\\1&0&0&0\\0&1&0&0\\0&0&1&0\\0&0&0&1\\0&0&0&0\\0&0&0&0\end{bmatrix}\begin{bmatrix}0&0&0&0\\0&0&0&0\\0&0&0&0\\1&0&0&0\\0&1&0&0\\0&0&1&0\\0&0&0&1\\0&0&0&0\end{bmatrix}\begin{bmatrix}0&0&0&0\\0&0&0&0\\0&0&0&0\\0&0&0&0\\1&0&0&0\\0&1&0&0\\0&0&1&0\\0&0&0&1\end{bmatrix},$$

$$\begin{bmatrix}0&0&0&1\\0&0&0&0\\0&0&0&0\\0&0&0&0\\0&0&0&0\\1&0&0&0\\0&1&0&0\\0&0&1&0\end{bmatrix}\begin{bmatrix}0&0&1&0\\0&0&0&1\\0&0&0&0\\0&0&0&0\\0&0&0&0\\0&0&0&0\\1&0&0&0\\0&1&0&0\end{bmatrix}\begin{bmatrix}0&1&0&0\\0&0&1&0\\0&0&0&1\\0&0&0&0\\0&0&0&0\\0&0&0&0\\0&0&0&0\\1&0&0&0\end{bmatrix}$$

When $d_{PS}$=2, the 4 possible realizations of E corresponding to $m_{PS}$={0, 1, 2, 3} are as follows $$\begin{bmatrix}1&0&0&0\\0&1&0&0\\0&0&1&0\\0&0&0&1\\0&0&0&0\\0&0&0&0\\0&0&0&0\\0&0&0&0\end{bmatrix}\begin{bmatrix}0&0&0&0\\0&0&0&0\\1&0&0&0\\0&1&0&0\\0&0&1&0\\0&0&0&1\\0&0&0&0\\0&0&0&0\end{bmatrix}\begin{bmatrix}0&0&0&0\\0&0&0&0\\0&0&0&0\\0&0&0&0\\1&0&0&0\\0&1&0&0\\0&0&1&0\\0&0&0&1\end{bmatrix}\begin{bmatrix}0&0&1&0\\0&0&0&1\\0&0&0&0\\0&0&0&0\\0&0&0&0\\0&0&0&0\\1&0&0&0\\0&1&0&0\end{bmatrix}.$$

When $d_{PS}$=3, the 3 possible realizations of E corresponding of $m_{PS}${0, 1, 2} are as follows $$\begin{bmatrix}1&0&0&0\\0&1&0&0\\0&0&1&0\\0&0&0&1\\0&0&0&0\\0&0&0&0\\0&0&0&0\\0&0&0&0\end{bmatrix}\begin{bmatrix}0&0&0&0\\0&0&0&0\\0&0&0&0\\1&0&0&0\\0&1&0&0\\0&0&1&0\\0&0&0&1\\0&0&0&0\end{bmatrix}\begin{bmatrix}0&0&1&0\\0&0&0&1\\0&0&0&0\\0&0&0&0\\0&0&0&0\\0&0&0&0\\1&0&0&0\\0&1&0&0\end{bmatrix}.$$

When $d_{PS}$=4, the 2 possible realizations of E corresponding of $m_{PS}$={0, 1} are as follows $$\begin{bmatrix}1&0&0&0\\0&1&0&0\\0&0&1&0\\0&0&0&1\\0&0&0&0\\0&0&0&0\\0&0&0&0\\0&0&0&0\end{bmatrix}\begin{bmatrix}0&0&0&0\\0&0&0&0\\0&0&0&0\\0&0&0&0\\1&0&0&0\\0&1&0&0\\0&0&1&0\\0&0&0&1\end{bmatrix}.$$

To summarize, in one embodiment, $m_{PS}$ parametrizes the location of the first 1 in the first column of E, whereas $d_{PS}$ represents the row shift corresponding to different values of $m_{PS}$.

In one embodiment, NR Type-I codebook is the baseline codebook for NR, with a variety of configurations. The most common utility of Type-I codebook is a special case of NR Type-II codebook with L=1 for RI=1, 2, wherein a phase coupling value is reported for each sub-band, i.e., $W_2$ is $2 \times N_3$, with the first row equal to [1, 1, . . . , 1] and the second row equal to $[e^{j2\pi\theta_0}, \ldots, e^{j2\pi\theta_{N_3-1}}]$. Under specific configurations, $\phi_0 = \phi_1 \ldots = \phi$, i.e., wideband reporting. For RI>2 different beams are used for each pair of layers. Obviously, NR Type-I codebook can be depicted as a low-resolution version of NR Type-II codebook with spatial beam selection per layer-pair and phase combining only.

Regarding codebook reporting, in one embodiment, the codebook report is partitioned into two parts based on the priority of information reported. Each part is encoded separately (Part 1 has a possibly higher code rate). Below are parameters for NR Type-II codebook:

Part 1: RI+CQI+Total number of coefficients
Part 2: SD basis indicator+FD basis indicator/layer+ Bitmap/layer+Coefficient
Amplitude info/layer+Coefficient Phase info/layer+Strongest coefficient indicator/layer Furthermore, in one embodiment, Part 2 CSI can be decomposed into sub-parts each with different priority (higher priority information listed first). Such partitioning is required to allow dynamic reporting size for codebook based on available resources in the uplink phase.

Also Type-II codebook, in one embodiment, is based on aperiodic CSI reporting, and only reported in PUSCH via DCI triggering (one exception). Type-I codebook can be based on periodic CSI reporting (PUCCH) or semi-persistent CSI reporting (PUSCH or PUCCH) or aperiodic reporting (PUSCH).

Regarding priority reporting for part 2 CSI, in one embodiment, multiple CSI reports may be transmitted, as shown in Table 1 below:

TABLE 1

| CSI Reports priority ordering |
|---|
| Priority 0:<br>For CSI reports 1 to $N_{Rep}$, Group 0 CSI for CSI reports configured as 'typeII-r16' or 'typeII-PortSelection-r16'; Part 2 wideband CSI for CSI reports configured otherwise |
| Priority 1:<br>Group 1 CSI for CSI report 1, if configured as 'typeII-r16' or 'typeII-PortSelection-r16'; Part 2 subband CSI of even subbands for CSI report 1, if configured otherwise |
| Priority 2:<br>Group 2 CSI for CSI report 1, if configured as 'typeII-r16' or 'typeII-PortSelection-r16'; Part 2 subband CSI of odd subbands for CSI report 1, if configured otherwise |
| Priority 3:<br>Group 1 CSI for CSI report 2, if configured as 'typeII-r16' or 'typeII-PortSelection-r16'; Part 2 subband CSI of even subbands for CSI report 2, if configured otherwise |

TABLE 1-continued

CSI Reports priority ordering

Priority 4:
Group 2 CSI for CSI report 2, if configured as 'typeII-r16' or 'typeII-PortSelection-r16'. Part 2 subband CSI of odd subbands for CSI report 2, if configured otherwise

.
.
.

Priority $2N_{Rep} - 1$:
Group 1 CSI for CSI report $N_{Rep}$, if configured as 'typeII-r16' or 'typeII-PortSelection-r16'; Part 2 subband CSI of even subbands for CSI report $N_{Rep}$, if configured otherwise Priority $2N_{Rep}$:
Group 2 CSI for CSI report $N_{Rep}$, if configured as 'typeII-r16' or 'typeII-PortSelection-r16'; Part 2 subband CSI of odd subbands for CSI report $N_{Rep}$, if configured otherwise Note that the priority of the NRep CSI reports are based on the following
- A CSI report corresponding to one CSI reporting configuration for one cell may have higher priority compared with another CSI report corresponding to one other CSI reporting configuration for the same cell
- CSI reports intended to one cell may have higher priority compared with other CSI reports intended to another cell
- CSI reports may have higher priority based on the CSI report content, e.g., CSI reports carrying L1-RSRP information have higher priority
- CSI reports may have higher priority based on their type, e.g., whether the CSI report is aperiodic, semi-persistent or periodic, and whether the report is sent via PUSCH or PUCCH, may impact the priority of the CSI report In light of that, CSI reports may be prioritized as follows, where CSI reports with lower IDs have higher priority $$Pri_{iCSI}(y,k,c,s)=2 \cdot N_{cells} \cdot M_s \cdot y + N_{cells} \cdot M_s \cdot k + M_s \cdot c + s$$

s: CSI reporting configuration index, and $M_s$: Maximum number of CSI reporting configurations
c: Cell index, and $N_{cells}$: Number of serving cells
k: 0 for CSI reports carrying L1-RSRP or L1-SINR, 1 otherwise
y: 0 for aperiodic reports, 1 for semi-persistent reports on PUSCH, 2 for semi-persistent reports on PUCCH, 3 for periodic reports.

Regarding triggering aperiodic CSI reporting on PUSCH, in one embodiment, for multi-TRP NCJT transmission, in one embodiment, two embodiments may be used (see FIG. 2):
  Either one downlink scheduling assignment is sent from one TRP, that schedules two PDSCH transmissions from two TRPs respectively. Only one TB can be transmitted, whose layers are divided across the two scheduled PDSCHs.
  Two downlink scheduling assignments are sent, with one scheduling DCI from each TRP. Each DCI schedules a PDSCH transmission from the corresponding TRP. In this case, one or more TBs can be transmitted from every TRP according to the rank of the channel from every TRP.

In one embodiment, the UE needs to report the needed CSI information for the network using the CSI framework in NR Release 15. From a UE perspective, CSI reporting is independent of what NCJT scheme is used on the downlink.

The triggering mechanism between a report setting and a resource setting can be summarized in Table 2 below:

TABLE 2

Triggering mechanism between a report setting and a resource setting

| | | Periodic CSI reporting | SP CSI reporting | AP CSI Reporting |
|---|---|---|---|---|
| Time Domain Behaviour of Resource Setting | Periodic CSI-RS | RRC configured | MAC CE (PUCCH) DCI (PUSCH) | DCI |
| | SP CSI-RS | Not Supported | MAC CE (PUCCH) DCI (PUSCH) | DCI |
| | AP CSI-RS | Not Supported | Not Supported | DCI |

Moreover, in some embodiments,
  All associated Resource Settings for a CSI Report Setting need to have same time domain behavior.
  Periodic CSI-RS/IM resource and CSI reports are always assumed to be present and active once configured by RRC
  Aperiodic and semi-persistent CSI-RS/IM resources and CSI reports needs to be explicitly triggered or activated.
  Aperiodic CSI-RS/IM resources and aperiodic CSI reports, the triggering is done jointly by transmitting a DCI Format 0_1.
  Semi-persistent CSI-RS/IM resources and semi-persistent CSI reports are independently activated.

Figure 4:
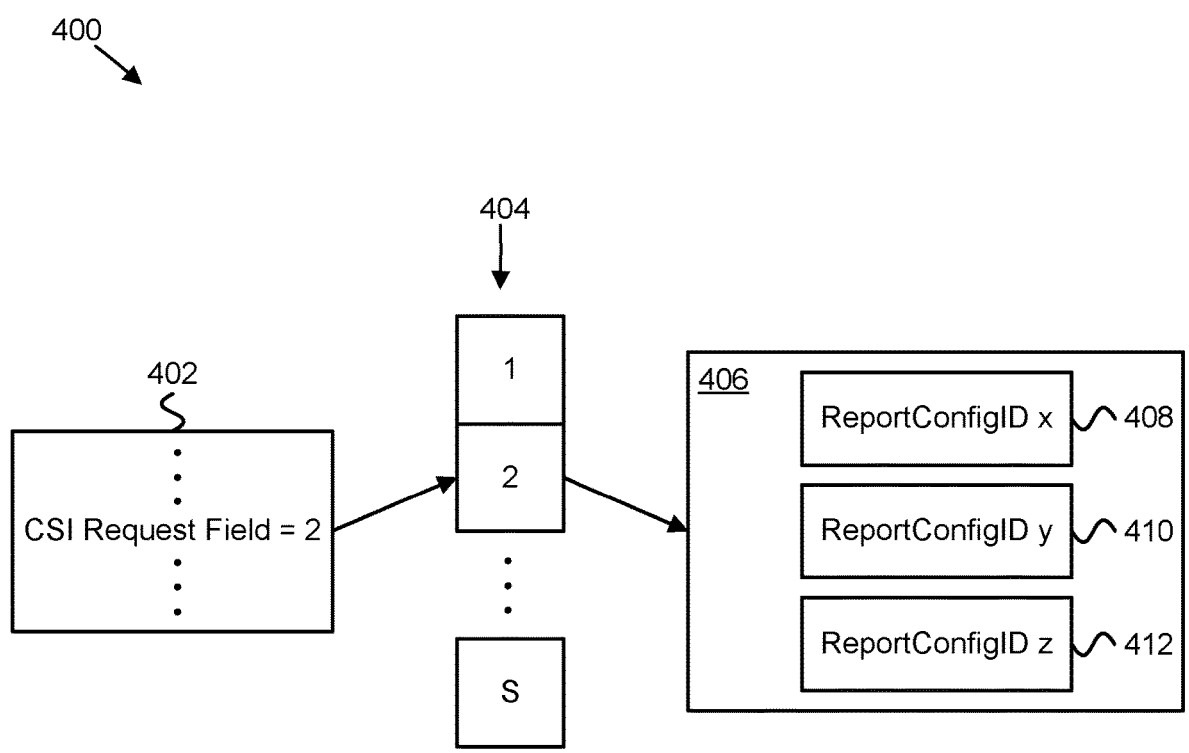
FIG. 4 is a diagram illustrating one embodiment of aperiodic trigger state defining a list of channel state information report settings for channel state information reporting for multiple transmit/receive points.

For multi-TRP NCJT, in one embodiment, aperiodic CSI reporting is likely to be triggered to inform the network about the channel conditions for every transmission hypothesis, since using periodic CSI-RS for the TRPs in the coordination cluster constitutes a large overhead. As mentioned earlier, for aperiodic CSI-RS/IM resources and aperiodic CSI reports, the triggering is done jointly by transmitting a DCI Format 0_1. The DCI Format 0_1 contains a CSI request field (0 to 6 bits). A non-zero request field points to a so-called aperiodic trigger state configured by remote resource control ("RRC"), as shown in FIG. 4. FIG. 4 is a diagram 400 illustrating one embodiment of an aperiodic trigger state defining a list of CSI report settings. Specifically, the diagram 400 includes a DCI format 0_1 402, a CSI request codepoint 404, and an aperiodic trigger state 2 406. Moreover, the aperiodic trigger state 2 includes a ReportConfigID x 408, a ReportConfigID y 410, and a ReportConfigID z 412. An aperiodic trigger state in turn is defined as a list of up to 16 aperiodic CSI Report Settings, identified by a CSI Report Setting ID for which the UE calculates simultaneously CSI and transmits it on the scheduled PUSCH transmission.

In one embodiment, if the CSI report setting is linked with aperiodic resource setting (e.g., may include multiple resource sets), the aperiodic NZP CSI-RS resource set for channel measurement, the aperiodic CSI-IM resource set (if used) and the aperiodic NZP CSI-RS resource set for IM (if used) to use for a given CSI report setting are also included in the aperiodic trigger state definition, as shown in FIG. 5. For aperiodic NZP CSI-RS, quasi-co-location ("QCL") source may be configured in the aperiodic trigger state. The UE may assume that the resources used for the computation of the channel and interference can be processed with the same spatial filter e.g., quasi-co-located with respect to "QCL-TypeD."

FIG. 5 is a code sample 500 illustrating one embodiment of the process by which an aperiodic trigger state indicates a resource set and QCL information.

FIG. 6 is a code sample 600 illustrating one embodiment of an RRC configuration including an non-zero power channel state information reference signal ("NZP-CSI-RS") resource 602 and a CSI-IM-resource 604.

Table 3 shows the type of uplink channels used for CSI reporting as a function of the CSI codebook type:

TABLE 1

Uplink channels used for CSI reporting as a function of the CSI codebook type

|  | Periodic CSI reporting | SP CSI reporting | AP CSI reporting |
| --- | --- | --- | --- |
| Type I WB | PUCCH Format 2, 3, 4 | PUCCH Format 2 PUSCH | PUSCH |
| Type I SB |  | PUCCH Format 3, 4 PUSCH | PUSCH |
| Type II WB |  | PUCCH Format 3, 4 PUSCH | PUSCH |
| Type II SB |  | PUSCH | PUSCH |
| Type II Part 1 only |  | PUCCH Format 3, 4 |  |

For aperiodic CSI reporting, in one embodiment, PUSCH-based reports are divided into two CSI parts: CSI Part 1 and CSI Part 2. The reason for this is that the size of CSI payload varies significantly, and therefore a worst-case UCI payload size design would result in large overhead.

In one embodiment, CSI Part 1 has a fixed payload size (and can be decoded by the gNB without prior information) and contains the following:
  RI (if reported), CRI (if reported) and CQI for the first codeword,
  number of non-zero wideband amplitude coefficients per layer for Type II CSI feedback on PUSCH.

In one embodiment, CSI Part 2 has a variable payload size that can be derived from the CSI parameters in CSI Part 1 and contains PMI and the CQI for the second codeword when RI>4.

Figure 7:
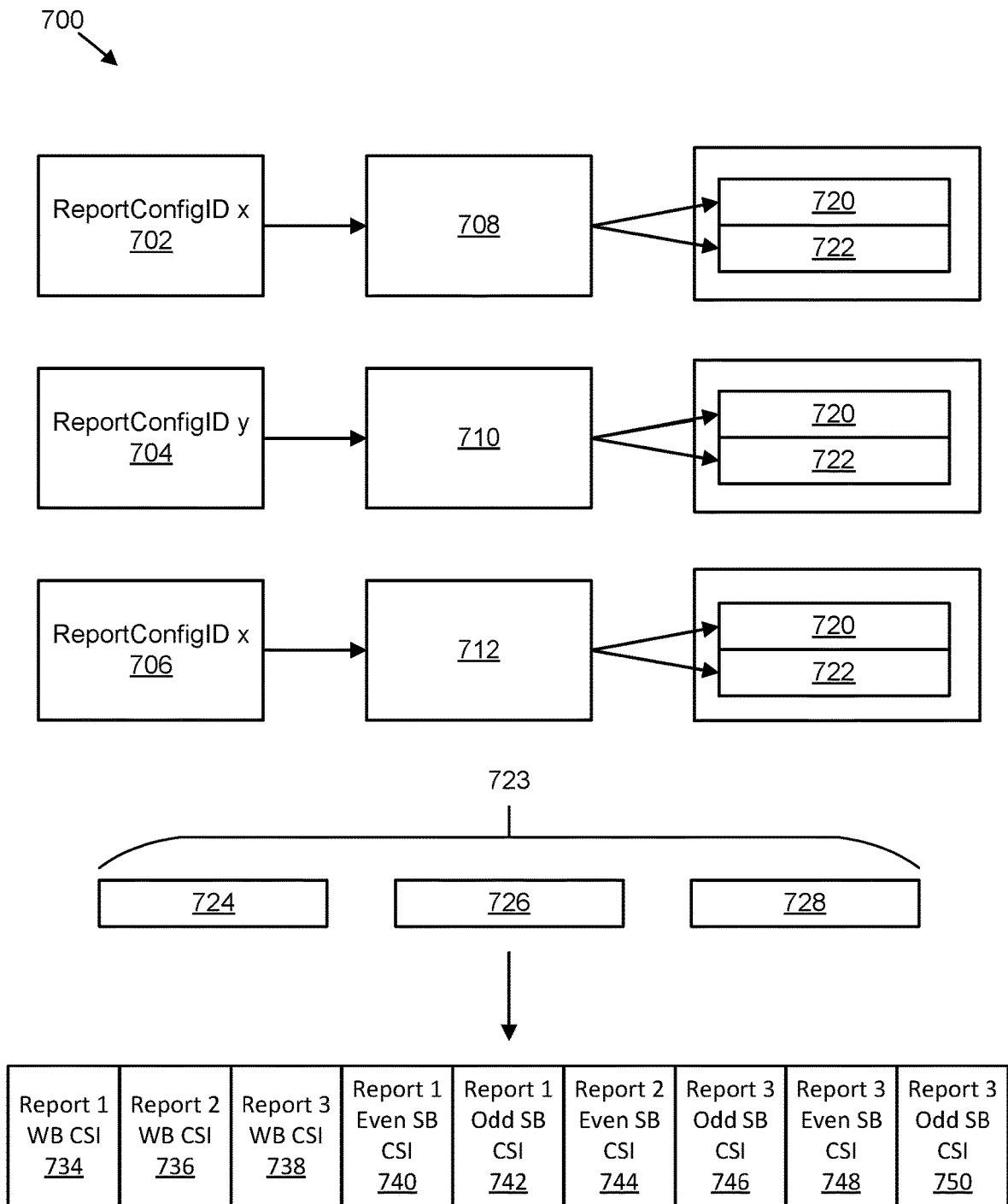
FIG. 7 is a schematic block diagram illustrating one embodiment of a partial channel state information omission for PUSCH-based channel state information for channel state information reporting for multiple transmit/receive points.

For example, if the aperiodic trigger state indicated by DCI format 0_1 defines 3 report settings x, y, and z, then the aperiodic CSI reporting for CSI part 2 will be ordered as indicated in FIG. 7.

FIG. 7 is a schematic block diagram 700 illustrating one embodiment of a partial CSI omission for PUSCH-based CSI. The diagram 700 includes a ReportConfigID x 702, a ReportConfigID y 704, and a ReportConfigID z 706. Moreover, the diagram 700 includes a first report 708 (e.g., requested quantities to be reported) corresponding to the ReportConfigID x 702, a second report 710 (e.g., requested quantities to be reported) corresponding to the ReportConfigID y 704, and a third report 712 (e.g., requested quantities to be reported) corresponding to the ReportConfigID z 706. Each of the first report 708, the second report 710, and the third report 712 includes a CSI part 1 720, and a CSI part 2 722. An ordering 723 of CSI part 2 across reports is CSI part 2 of the first report 724, CSI part 2 of the second report 726, and CSI part 2 of the third report 728. Moreover, the CSI part 2 reports may produce a report 1 WB CSI 734, a report 2 WB CSI 736, a report 3 WB CSI 438, a report 1 even SB CSI 740, a report 1 odd SB CSI 742, a report 2 even SB CSI 744, a report 2 odd SB CSI 746, a report 3 even SB CSI 748, and a report 3 odd SB CSI 750.

In various embodiments, CSI reports may be prioritized according to: 1) time-domain behavior and physical channel where more dynamic reports are given precedence over less dynamic reports and PUSCH has precedence over PUCCH; 2) CSI content where beam reports (e.g., L1-RSRP reporting) have priority over regular CSI reports; 3) a serving cell to which a CSI corresponds (e.g., for CA operation)—CSI corresponding to a PCell has priority over CSI corresponding to Scells; and/or 4) a report configuration identifier (e.g., reportConfigID). In such embodiments, the ordering may not take into account that some multi-TRP NCJT transmission hypothesis, as measured by the UE, may achieve low spectral efficiency performance and may be given a lower priority.

Regarding UCI bit sequence generation, in one embodiment, the Rank Indicator ("RI"), if reported, has bitwidth of $\min(\lceil \log_2 N_{ports} \rceil, \lceil \log_2 n_{RI} \rceil)$, where $N_{ports}$, $n_{RI}$ represent the number of antenna ports and the number of allowed rank indicator values, respectively. On the other hand, the CSI-RS Resource Indicator ("CRI") and the Synchronization Signal Block Resource Indicator ("SSBRI") each have bitwidths of $\lceil \log_2 K_S^{CSI-RS} \rceil$, $\lceil \log_2 K_S^{SSB} \rceil$, respectively, where $K_S^{CSI-RS}$ is the number of CSI-RS resources in the corresponding resource set, and $K_S^{SSB}$ is the configured number of SS/PBCH blocks in the corresponding resource set for reporting 'ssb-Index-RSRP'. The mapping order of CSI fields of one CSI report with wideband PMI and wideband CQI on PUCCH is depicted in Table 2, is as follows:

TABLE 2

Mapping order of CSI fields of one CSI report with wideband PMI and CQI on PUCCH

| CSI report number | CSI fields |
| --- | --- |
| CSI report #n | CRI, if reported<br>Rank Indicator, if reported<br>Layer Indicator, if reported<br>Zero padding bits, if needed<br>PMI wideband information fields, if reported<br>PMI wideband information, if reported<br>Wideband CQI for the first Transport Block, if reported<br>Wideband CQI for the second Transport Block, if reported |

Several embodiments of the proposed solution are described below. According to a possible embodiment, one or more elements or features from one or more of the described embodiments may be combined, e.g., for CSI measurement, feedback generation and/or reporting which may reduce the overall CSI feedback overhead.

In one embodiment, there are a number of assumptions related to the problem to be solved, which may include:

For ease of exposition, hereafter we use the notion of a "TRP" in a general fashion to include at least one of TRPs, Panels, communication (e.g., signals/channels) associated with a CORESET (control resource set) pool, communication associated with a transmission configuration indicator ("TCI") state from a transmission configuration comprising at least two TCI states.

The codebook type used is arbitrary; flexibility for use different codebook types (Type-I and Type-II codebooks), unless otherwise stated.

At least aperiodic CSI reporting on PUSCH is supported. Other CSI reporting configuration type such as semi-persistent CSI reporting on PUSCH may also be used At least multi-TRP/Panel with single DCI is assumed. Multi-TRP/Panel with multiple DCI can also be used.

At least multi-TRP/Panel with Spatial Division Multiplexing ("SDM") is assumed

In general, in one embodiment, the network indicated to the UE that multi-TRP/Panel CSI feedback is required, either explicitly or implicitly, via one (or more) of the following alternatives:

Introducing a new RRC parameter, e.g., $N_{TRP}$ or CSIGroup. Based on that, there could be multiple CSI reports or CSI sub-reports or CSI-components for one CSI report configuration. This parameter would be incorporated in CSI report priority ordering;

Introduce a new report quantity (for CSI reports involving mTRP). Now, each report would correspond to a report setting;

Multi-TRP is implied from the QCL relationships on RSs, e.g., aperiodic CSI-RS;

One or more codepoints referring to different DCI triggering states would be allocated to multi-TRP setup for CSI feedback. Each state (includes one or more CSI report settings) would be triggered by the network and RRC configured;

Multi-TRP is implied from the higher layer parameter CodebookType;

Multi-TRP is implied from the higher layer parameter CodebookConfig;

In one embodiment related to multiple CSI reports per codebook, assume the following CSI reporting structure, wherein without loss of generality, $N_{TRP}=3$ and $M_s=2$. In one embodiment, for TRP t information corresponding to a rank $v_t$ codebook is reported, where the information for each TRP is distributed across one or more CSI reports. One example is that the information corresponding to the different transmission layers intended for a given TRP t are partitioned into two groups with $v'_t$ and $v''_t$ layers, respectively, where $v_t=v'_t+v''_t$, as follows:

CSI report 1: Partial CSI corresponding to the link with TRP 1, e.g., information corresponding to the first $v'_1$ layers CSI report 2: Partial CSI corresponding to the link with TRP 1, e.g., information corresponding to the last $v''_1$ layers CSI report 3: Partial CSI corresponding to the link with TRP 2, e.g., information corresponding to the first $v'_2$ layers CSI report 4: Partial CSI corresponding to the link with TRP 2, e.g., information corresponding to the last $v'_2$ layers CSI report 5: Partial CSI corresponding to the link with TRP 3, e.g., information corresponding to the first $v'_3$ layers CSI report 6: Partial CSI corresponding to the link with TRP 3, e.g., information corresponding to the last $v''_3$ layers Note here that, in one embodiment, in case the CSI report includes CRI information, the value of the field corresponding to the CRI (if reported) in the CSI report should be the same for all the CSI reports intended to the same TRP, such as CSI reports 2t-1 and 2t in the example above, corresponding to TRP t. In another embodiment, the CRI field is included in no more than one CSI report intended to a given TRP t, i.e., either CSI report 2t-1 or report 2t in the example above.

In a first proposal, for CSI feedback under multi-TRP transmission, where one or more CSI reports may be intended for any given TRP t, the CRI (if reported) may be in either one of the following formats The same CRI value is reported for all the CSI reports intended for codebook design at TRP t; or The CRI value is included in only one CSI report intended for intended for codebook design at TRP t, where this CRI value would be used for other CSI reports intended or codebook design at the same TRP t.

In one embodiment, a given CSI report may consist of Channel Quality Indicator ("CQI"), precoding matrix indicator ("PMI"), CSI-RS resource indicator ("CRI"), SS/PBCH Block Resource indicator ("SSBRI"), layer indicator ("LI"), rank indicator ("RI"), L1-RSRP or L1-SINR. In one embodiment, a given CSI report has no more than one of each of the PMI, CRI, SSBRI, LI, RI, L1-RSRP, L1-SINR. Two sets of CQI values may be reported only when two transport blocks are transmitted, e.g., RI>4. Each CSI Report is triggered by a given CSI Reporting Setting. In certain embodiments, one or more CSI reporting settings may trigger one CSI report. This may be conditioned on the event that a common CSI resource setting, CSI resource set or both are triggered within the CSI report settings.

In a second proposal, for CSI feedback under multi-TRP transmission, one or more CSI reporting settings may trigger one CSI report sent as uplink control information. This may be conditioned on the event that a common CSI resource setting, CSI resource set or both are triggered within the CSI report settings.

In one embodiment, different embodiments for the CSI report structure can be either one of the following:

One super CSI report that includes no more than one CRI (if reported), one SSBRI (if reported), one L1-RSRP (if reported), one L1-SINR (if reported), up to two CQI (if reported, where one CQI set would be reported if rank is no more than four, otherwise two CQI sets are reported), up to two RI (if reported), up to two PMI (if reported) and up to two LI (if reported).

One super CSI report that includes no more than one CRI (if reported), one SSBRI (if reported), one L1-RSRP (if reported), one L1-SINR (if reported), one RI (if reported), up to two CQI (if reported, where one CQI set would be reported if rank is no more than four, otherwise two CQI sets are reported), up to two PMI (if reported) and up to two LI (if reported).

One super CSI report that includes no more than one CRI (if reported), one SSBRI (if reported), one L1-RSRP (if reported), one L1-SINR (if reported), one LI (if reported), up to two CQI (if reported, where one CQI set would be reported if rank is no more than four, otherwise two CQI sets are reported), up to two RI (if reported) and up to two PMI (if reported).

One super CSI report that includes no more than one CRI (if reported), one SSBRI (if reported), one L1-RSRP (if reported), one L1-SINR (if reported), one RI (if reported), one LI (if reported), up to two CQI (if reported, where one CQI set would be reported if rank is no more than four, otherwise two CQI sets are reported), and up to two PMI (if reported).

One super CSI report that includes no more than one CRI (if reported), one SSBRI (if reported), one L1-RSRP (if reported), one L1-SINR (if reported), one RI (if reported), one PMI (if reported), up to two CQI (if reported, where one CQI set would be reported if rank is no more than four, otherwise two CQI sets are reported), and up to two LI (if reported).

Note that, in one embodiment, the aforementioned CSI report structures may be tied to the triggering of more than one CSI reporting settings for a given user, for example, a user triggered with two CSI reporting settings would send a CSI report including up to two PMI. On a different note, in case one RI is reported and two PMI are reported, the rank of each PMI may be inferred by a pre-defined rule, e.g., the first PMI includes [RI/2] layers by default, whereas the second PMI includes [RI/2] by default, or vice versa.

Also, for any additional RI, PMI, LI, L1-RSRP, L1-SINR, in one embodiment, the indicator value reported may be a differential value that depends on the value of another indicator of the same type.

In a third proposal, a CSI report structure includes one or more of each of RI (if reported), PMI (if reported), and LI (if reported), wherein the additional indicators may refer to differential values with respect to one indicator of the same type.

Note that, in one embodiment, it is possible that more than one CRI, or more than one SSBRI, or both, are reported within the CSI report, where each CRI value represents a different transmission hypothesis under multi-TRP transmission. If so, only one CRI or SSBRI value may be used for a given hypothesis. For such CSI Report structures, if more than one CRI is reported, e.g., 2 CRI values, the CRI bitwidth would be $2 \cdot \lceil \log_2 K_S^{CSI-RS} \rceil$ bits, whereas if 2 SSBRI values are reported, the SSBRI bitwidth would double to $2 \cdot \lceil \log_2 K_S^{SSB} \rceil$ bits. Similar increases in bitwidth of other indicator parameters in the CSI Report due to reporting multiple values may be expected.

In a fourth proposal a CSI report structure may include one or more of each of CRI (if reported), SSBRI (if reported). Only one CRI (if reported) may be used at the network for a given user. Similarly, only one SSBRI (if reported) may be used at the network for a given user.

Also, in one embodiment, instead of reporting more than one RI value (if reported) in a given CSI report, one codepoint may be used to represent two RI (Rank indicators) within the CSI report. The same may be done for the CRI, and/or the SSBRI, and/or the CQI, and/or the PMI, and/or the LI, if reported.

In a fifth proposal, a CSI report structure may include one codepoint that represents one or more CRI values (if reported), and/or one codepoint may represent one or more SSBRI values (if reported), and/or one codepoint may represent one or more RI values (if reported), and/or one codepoint may represent one or more PMI values (if reported), and/or one codepoint may represent one or more CQI values (if reported), and/or one codepoint may represent one or more LI values (if reported).

In NR, in certain embodiments, some users may be equipped with more than one antenna panel, wherein the boresight of one panel may be in a different direction, compared with that of other panels. In such an embodiment, a user with multiple panels can be regarded as multiple virtual users with a single panel each. Also, due to the different directionality of the panels, the L1-RSRP and/or L1-SINR may vary across different panels. In one embodiment, the presence of multiple antenna panels at the UE may be indicated via a UE capability, so as to optimize the signaling for users with multiple panels.

In a sixth proposal, a UE may be embodied with capability signaling that indicates the UE has multiple antenna panels. Moreover, in certain embodiments, supporting CSI feedback under multi-TRP transmission may be exclusive for users with a given UE capability, either directly via indicating the UE can handle multi-TRP transmission, or via one or more of the following: the number of CSI Reporting Settings, the number of CSI Resource Settings, and the number of CSI Resource Sets.

In a seventh proposal, a UE may be embodied with capability signaling that indicates the UE can support multi-TRP transmission. In one embodiment, this may be done via a dedicated UE capability parameter, or via a threshold on one or more of the following: the number of CSI Reporting Settings, the number of CSI Resource Settings, and the number of CSI Resource Sets, which the user can handle within a given time and/or frequency resource.

For a user with multiple antenna panels, in one embodiment, one CSI reporting configuration may trigger one or more CSI reports. Alternatively, in certain embodiments, for a user with multiple antenna panels, one CSI reporting configuration may trigger a CSI report with one or more of each of the CRI (if reported), SSBRI (if reported), RI (if reported), PMI (if reported), CQI (if reported), LI (if reported), L1-RSRP (if reported), L1-SINR (if reported). Note that additional CQI, RI, PMI, L1-RSRP, L1-SINR may be either mapped to an absolute value or a differential value, based on the value of another indicator of the same type.

In an eighth proposal, for a user with multiple antenna panels, in one embodiment, one CSI reporting configuration may trigger one or more CSI reports, where the CSI report structure resembles that in Section 3.2. Alternatively, for a user with multiple antenna panels, one CSI reporting configuration may trigger a CSI report with one or more of each of the CRI (if reported), SSBRI (if reported), RI (if reported), PMI (if reported), CQI (if reported), LI (if reported), L1-RSRP (if reported), L1-SINR (if reported), where the CSI report structure may resemble that in Section 3.3. Additional CQI, RI, PMI, L1-RSRP, L1-SINR can be either mapped to an absolute value or a differential value, based on the value of another indicator of the same type.

In some embodiments, the terms antenna, panel, and antenna panel are used interchangeably. An antenna panel may be a hardware that is used for transmitting and/or receiving radio signals at frequencies lower than 6 GHz, e.g., frequency range 1 ("FR1"), or higher than 6 GHz, e.g., frequency range 2 ("FR2") or millimeter wave (mmWave). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device (e.g., UE, node, TRP) antenna panel may be a physical or logical antenna array comprising a set of antenna elements or antenna ports that share a common or a significant portion of an RF chain (e.g., in-phase/quadrature ("I/Q") modulator, analog to digital ("A/D") converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" may be transparent to gNB. For certain condition(s), gNB or network can assume the mapping between device's physical antennas to the logical entity "device panel" may not be changed. For example, the condition may include until the next update or report from device or comprise a duration of time over which the gNB assumes there will be no change to the mapping. A Device may report its capability with respect to the "device panel" to the gNB or network. The device capability may include at least the number of "device panels". In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed.

Two antenna ports are said to be quasi co-located ("QCL") if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties and different subset of large-scale properties may be indicated by a QCL Type. For example, qcl-Type may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

Spatial Rx parameters may include one or more of: angle of arrival ("AoA") Dominant AoA, average AoA, angular spread, Power Angular Spectrum ("PAS") of AoA, average AoD (angle of departure), PAS of AoD, transmit/receive channel correlation, transmit/receive beamforming, spatial channel correlation etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state associated with a target transmission can indicate parameters for configuring a quasi-collocation relationship between the target transmission (e.g., target RS of DM-RS ports of the target transmission during a transmission occasion) and a source reference signal(s) (e.g., SSB/CSI-RS/SRS) with respect to quasi co-location type parameter(s) indicated in the corresponding TCI state. A device can receive a configuration of a plurality of transmission configuration indicator states for a serving cell for transmissions on the serving cell.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

Figure 8:
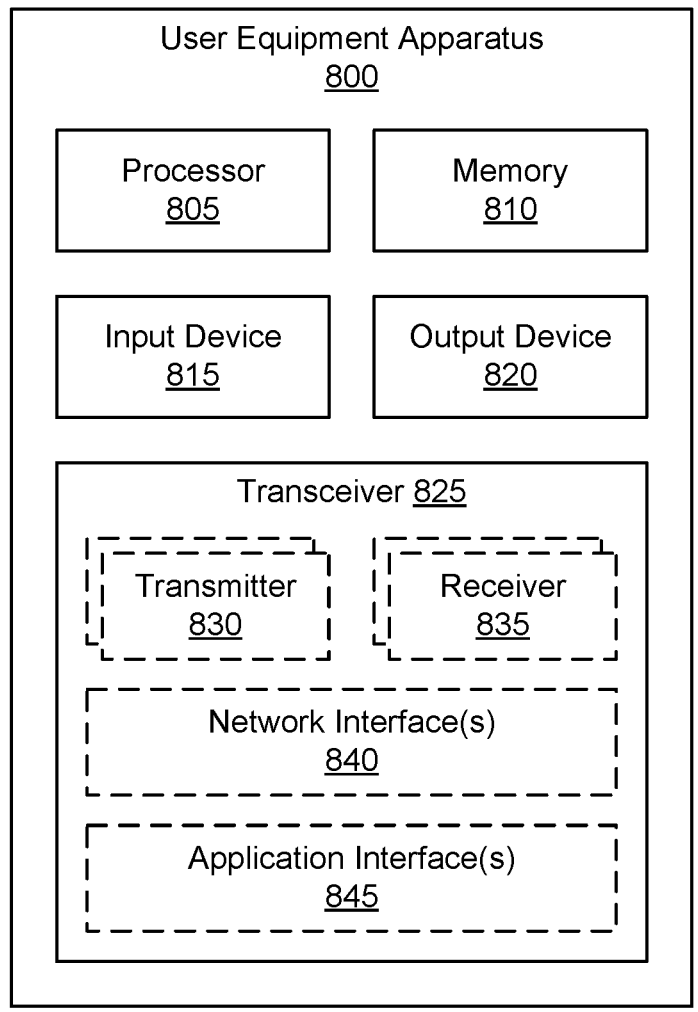
FIG. 8 is a block diagram illustrating one embodiment of a user equipment apparatus that may be used for channel state information reporting for multiple transmit/receive points.

FIG. 8 depicts a user equipment apparatus 800 that may be used for channel state information reporting for multiple transmit/receive points, according to embodiments of the disclosure. In various embodiments, the user equipment apparatus 800 is used to implement one or more of the solutions described above. The user equipment apparatus 800 may be one embodiment of the remote unit 105 and/or the UE 205, described above. Furthermore, the user equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. In some embodiments, the transceiver 825 communicates with one or more cells (or wireless coverage areas) supported by one or more base units 121. In various embodiments, the transceiver 825 is operable on unlicensed spectrum. Moreover, the transceiver 825 may include multiple UE panel supporting one or more beams. Additionally, the transceiver 825 may support at least one network interface 840 and/or application interface 845. The application interface(s) 845 may support one or more APIs. The network interface(s) 840 may support 3GPP reference points, such as Uu, N1, PC5, etc. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825. In certain embodiments, the processor 805 may include an application processor (also known as "main processor") which manages application-domain and operating system ("OS") functions and a baseband processor (also known as "baseband radio processor") which manages radio functions.

In various embodiments, the processor 805 and/or transceiver 825 controls the user equipment apparatus 800 to implement the above described UE behaviors. For example, a transceiver 825 receives an indication from a mobile wireless communication network that channel state information ("CSI") corresponding to multiple transmit/receives points ("TRPs") is to be reported. In one embodiment, a processor 805 generates at least one CSI report according to the CSI reporting configuration, the at least one CSI report comprising a CSI-reference signal ("CSI-RS") resource indicator ("CRI"). The transceiver 825 may report the at least one CSI report comprising the CRI to the mobile wireless communication network.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to channel state information reporting for multiple transmit/receive points. For example, the memory 810 may store various parameters, panel/beam configurations, resource assignments, policies, and the like as described above. In certain embodiments, the memory 810 also stores program code and related data, such as an operating system or other controller algorithms operating on the user equipment apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 communicates with one or more network functions of a mobile communication network via one or more access networks. The transceiver 825 operates under the control of the processor 805 to transmit messages, data, and other signals and also to receive messages, data, and other signals. For example, the processor 805 may selectively activate the transceiver 825 (or portions thereof) at particular times in order to send and receive messages.

The transceiver 825 includes at least transmitter 830 and at least one receiver 835. One or more transmitters 830 may be used to provide UL communication signals to a base unit 121, such as the UL transmissions described herein. Similarly, one or more receivers 835 may be used to receive DL communication signals from the base unit 121, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an ASIC, or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
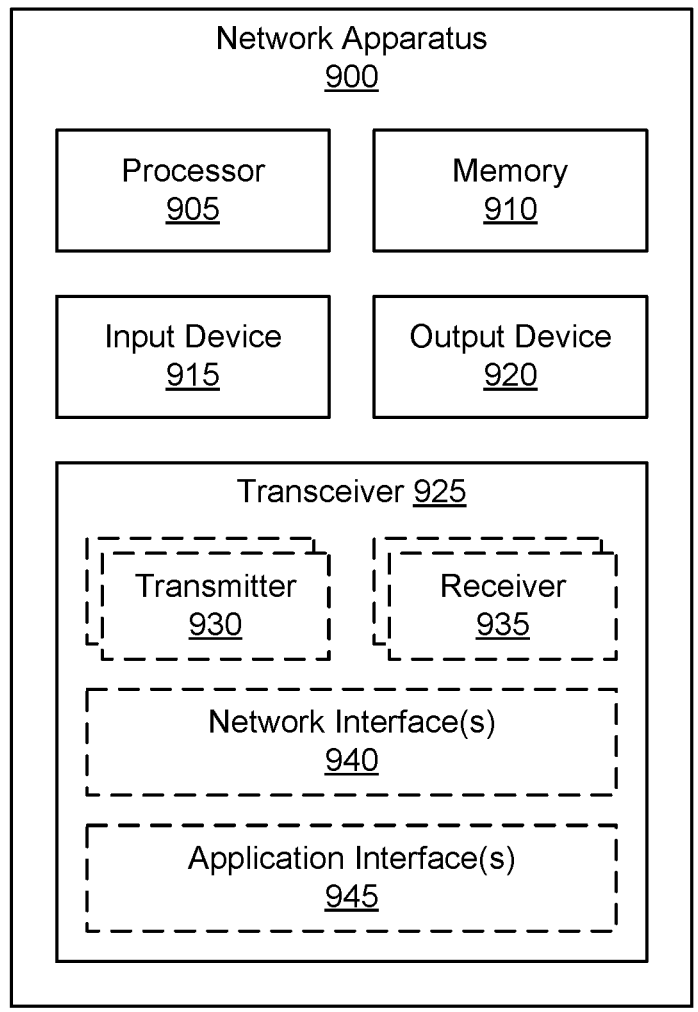
FIG. 9 is a block diagram illustrating one embodiment of a network apparatus that may be used for channel state information reporting for multiple transmit/receive points.

FIG. 9 depicts a network apparatus 900 that may be used for channel state information reporting for multiple transmit/receive points, according to embodiments of the disclosure. In one embodiment, network apparatus 900 may be one implementation of a RAN node, such as the base unit 121, the RAN node 210, or gNB, described above. Furthermore, the base network apparatus 900 may include a processor 905, a memory 910, an input device 915, an output device 920, and a transceiver 925.

In some embodiments, the input device 915 and the output device 920 are combined into a single device, such as a touchscreen. In certain embodiments, the network apparatus 900 may not include any input device 915 and/or output device 920. In various embodiments, the network apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. Here, the transceiver 925 communicates with one or more remote units 105. Additionally, the transceiver 925 may support at least one network interface 940 and/or application interface 945. The application interface(s) 945 may support one or more APIs. The network interface(s) 940 may support 3GPP reference points, such as Uu, N1, N2 and N3. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a CPU, a GPU, an auxiliary processing unit, a FPGA, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925. In certain embodiments, the processor 805 may include an application processor (also known as "main processor") which manages application-domain and operating system ("OS") functions and a baseband processor (also known as "baseband radio processor") which manages radio function.

In various embodiments, the network apparatus 900 is a RAN node (e.g., gNB) that includes a transceiver 925 that sends, to a user equipment ("UE") device, an indication that channel state information ("CSI") corresponding to multiple transmit/receives points ("TRPs") is to be reported and receives at least one CSI report from the UE corresponding to one or more of the multiple TRPs, the CSI report generated according to the CSI reporting configuration, the at least one CSI report comprising a CSI-reference signal ("CSI-RS") resource indicator ("CRI").

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to channel state information reporting for multiple transmit/receive points. For example, the memory 910 may store parameters, configurations, resource assignments, policies, and the like, as described above. In certain embodiments, the memory 910 also stores program code and related data, such as an operating system or other controller algorithms operating on the network apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the network apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 includes at least transmitter 930 and at least one receiver 935. One or more transmitters 930 may be used to communicate with the UE, as described herein. Similarly, one or more receivers 935 may be used to communicate with network functions in the NPN, PLMN and/or RAN, as described herein. Although only one transmitter 930 and one receiver 935 are illustrated, the network apparatus 900 may have any suitable number of transmitters 930 and receivers 935. Further, the transmitter(s) 930 and the receiver(s) 935 may be any suitable type of transmitters and receivers.

Figure 10:
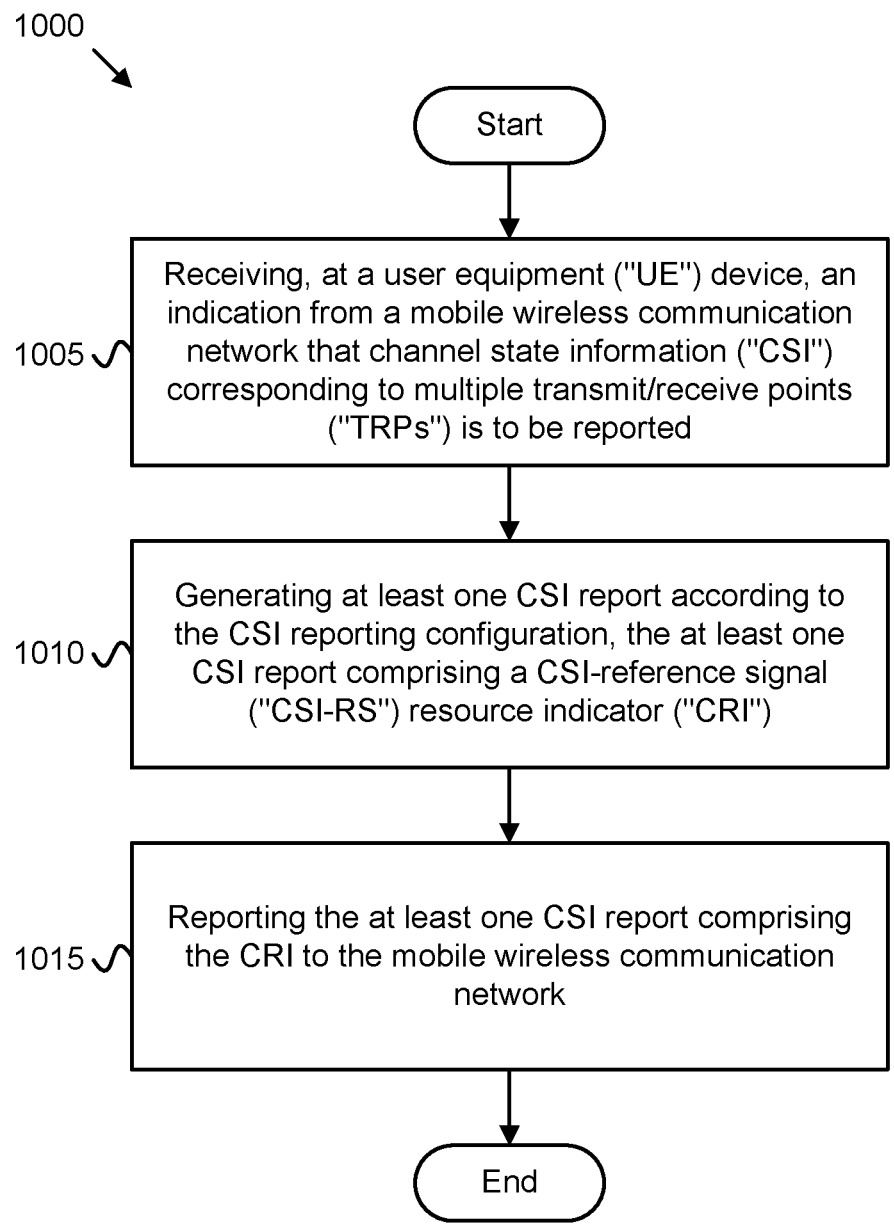
FIG. 10 is a flowchart diagram illustrating one embodiment of a method for channel state information reporting for multiple transmit/receive points.

FIG. 10 is a flowchart diagram of a method 1000 for channel state information reporting for multiple transmit/receive points. The method 1000 may be performed by a UE as described herein, for example, the remote unit 105, the UE 205 and/or the user equipment apparatus 800. In some embodiments, the method 1000 may be performed by a processor executing program code, for example, a microcontroller, a microprocessor, a CPU, a GPU, an auxiliary processing unit, a FPGA, or the like.

The method 1000, in one embodiment includes receiving 1005, at a user equipment ("UE") device, an indication from a mobile wireless communication network that channel state information ("CSI") corresponding to multiple transmit/receive points ("TRPs") is to be reported. In further embodiments, the method 1000 includes generating 1010 at least one CSI report according to the CSI reporting configuration, the at least one CSI report comprising a CSI-reference signal ("CSI-RS") resource indicator ("CRI"). In some embodiments, the method 1000 includes reporting 1015 the at least one CSI report comprising the CRI to the mobile wireless communication network. The method 1000 ends.

Figure 11:
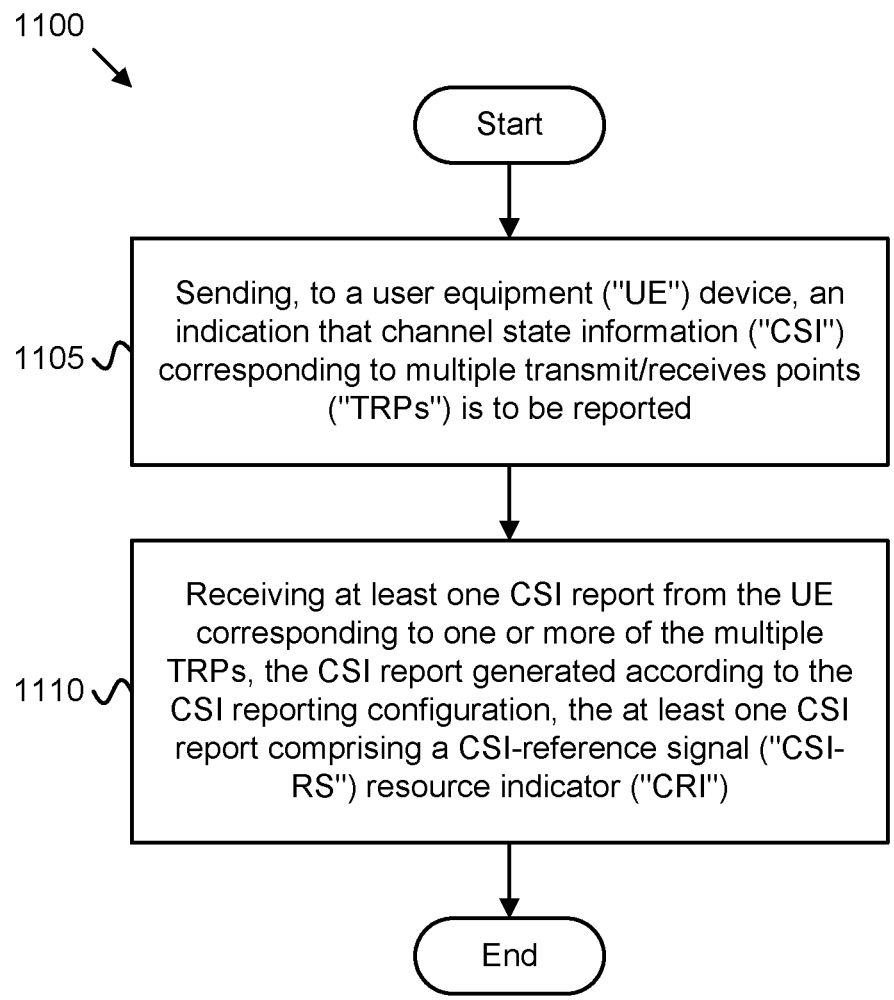
FIG. 11 is a flowchart diagram illustrating one embodiment of another method for channel state information reporting for multiple transmit/receive points

FIG. 11 is a flowchart diagram of a method 1100 for channel state information reporting for multiple transmit/receive points. The method 1100 may be performed by a network device described herein, for example, a gNB, a base station, and/or the network equipment apparatus 900. In some embodiments, the method 1100 may be performed by a processor executing program code, for example, a microcontroller, a microprocessor, a CPU, a GPU, an auxiliary processing unit, a FPGA, or the like.

In one embodiment, the method 1100 includes sending 1105, to a user equipment ("UE") device, an indication that channel state information ("CSI") corresponding to multiple transmit/receives points ("TRPs") is to be reported. In further embodiments, the method 1100 includes receiving 1110 at least one CSI report from the UE corresponding to one or more of the multiple TRPs, the CSI report generated according to the CSI reporting configuration, the at least one CSI report comprising a CSI-reference signal ("CSI-RS") resource indicator ("CRI"). The method 1100 ends.

In one embodiment, a first apparatus for channel state information reporting for multiple transmit/receive points may be embodied as a UE as described herein, for example, the remote unit 105, the UE 205 and/or the user equipment apparatus 800. In some embodiments, the first apparatus may include a processor executing program code, for example, a microcontroller, a microprocessor, a CPU, a GPU, an auxiliary processing unit, a FPGA, or the like.

The first apparatus, in one embodiment, includes a transceiver that receives an indication from a mobile wireless communication network that channel state information ("CSI") corresponding to multiple transmit/receives points ("TRPs") is to be reported. The multiple TRPs may correspond to a transmission configuration comprising multiple transmission configuration indicator ("TCI") states. The indication may indicate a CSI reporting configuration. In one embodiment, the first apparatus includes a processor that generates at least one CSI report according to the CSI reporting configuration, the at least one CSI report comprising a CSI-reference signal ("CSI-RS") resource indicator ("CRI"). In further embodiments, the transceiver reports the at least one CSI report comprising the CRI to the mobile wireless communication network.

In one embodiment, a value of a field of the at least one CSI report that corresponds to the CRI is the same across a plurality of CSI reports corresponding to one or more of the multiple TRPs. In some embodiments, a value of a field of the at least one CSI report that corresponds to the CRI is included in at most one CSI report corresponding to one or more of the multiple TRPs. In certain embodiments, the at least one CSI report comprises at most two precoding matrix indicators ("PMIs"), at most two rank indicators ("RIs"), at most two layer indicators ("LIs"), and at most two CRIs.

In one embodiment, in response to the at least one CSI report comprising the at most two CRIs, the at most two CRIs are represented using a single codepoint. In further embodiments, in response to the at least one CSI report comprising the at most two RIs, the at most two RIs are represented using a single codepoint.

In some embodiments, a capability of reporting the at least one CSI report corresponding to one or more of the multiple TRPs is determined based at least in part on an indication that multiple TRP transmission is supported, a number of CSI reporting settings, a number of CSI resource settings, and a number of CSI resource sets.

In one embodiment, a first method for channel state information reporting for multiple transmit/receive points may be performed by a UE as described herein, for example, the remote unit 105, the UE 205 and/or the user equipment apparatus 800. In some embodiments, the first method may be performed by a processor executing program code, for example, a microcontroller, a microprocessor, a CPU, a GPU, an auxiliary processing unit, a FPGA, or the like.

In one embodiment, the first method includes receiving, at a user equipment ("UE") device, an indication from a mobile wireless communication network that channel state information ("CSI") corresponding to multiple transmit/receive points ("TRPs") is to be reported. The multiple TRPs may correspond to a transmission configuration comprising multiple transmission configuration indicator ("TCI") states. The indication may indicate a CSI reporting configuration. In one embodiment, the first method includes generating at least one CSI report according to the CSI reporting configuration, the at least one CSI report comprising a CSI-reference signal ("CSI-RS") resource indicator ("CRI"). IN certain embodiments, the first method includes reporting the at least one CSI report comprising the CRI to the mobile wireless communication network.

In one embodiment, a value of a field of the at least one CSI report that corresponds to the CRI is the same across a plurality of CSI reports corresponding to one or more of the multiple TRPs. In certain embodiments, a value of a field of the at least one CSI report that corresponds to the CRI is included in at most one CSI report corresponding to one or more of the multiple TRPs.

In one embodiment, the at least one CSI report comprises at most two precoding matrix indicators ("PMIs"), at most two rank indicators ("RIs"), at most two layer indicators ("LIs"), and at most two CRIs. In certain embodiments, in response to the at least one CSI report comprising the at most two CRIs, the at most two CRIs are represented using a single codepoint.

In one embodiment, in response to the at least one CSI report comprising the at most two RIs, the at most two RIs are represented using a single codepoint. In certain embodiments, a capability of reporting the at least one CSI report corresponding to the multiple TRPs is determined based at least in part on an indication that multiple TRP transmission is supported, a number of CSI reporting settings, a number of CSI resource settings, and a number of CSI resource sets.

A second apparatus for channel state information reporting for multiple transmit/receive points may be embodied as a network device described herein, for example, a gNB, a base station, and/or the network equipment apparatus 900. In some embodiments, the second apparatus includes a processor executing program code, for example, a microcontroller, a microprocessor, a CPU, a GPU, an auxiliary processing unit, a FPGA, or the like.

In one embodiment, the second apparatus includes a transceiver that sends, to a user equipment ("UE") device, an indication that channel state information ("CSI") corresponding to multiple transmit/receives points ("TRPs") is to be reported. The multiple TRPs may correspond to a transmission configuration comprising multiple transmission configuration indicator ("TCI") states. The indication may indicate a CSI reporting configuration. In one embodiment, the transceiver receives at least one CSI report from the UE corresponding to one or more of the multiple TRPs, the CSI report generated according to the CSI reporting configuration, the at least one CSI report comprising a CSI-reference signal ("CSI-RS") resource indicator ("CRI").

A second method for channel state information reporting for multiple transmit/receive points may be performed by a network device described herein, for example, a gNB, a base station, and/or the network equipment apparatus 900. In some embodiments, the second method may be performed by a processor executing program code, for example, a microcontroller, a microprocessor, a CPU, a GPU, an auxiliary processing unit, a FPGA, or the like.

In one embodiment, the second method includes sending, to a user equipment ("UE") device, an indication that channel state information ("CSI") corresponding to multiple transmit/receives points ("TRPs") is to be reported. The multiple TRPs may correspond to a transmission configuration comprising multiple transmission configuration indicator ("TCI") states. The indication may indicate a CSI reporting configuration. In one embodiment, the second method includes receiving at least one CSI report from the UE corresponding to one or more of the multiple TRPs, the CSI report generated according to the CSI reporting configuration, the at least one CSI report comprising a CSI-reference signal ("CSI-RS") resource indicator ("CRI").

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
at least one memory; and
at least one processor coupled with the at least one memory and configured to cause the UE to:
receive an indication to report channel state information ("CSI") associated with multiple transmit/receives points ("TRPs"), wherein the indication indicates a CSI reporting configuration;
generate a CSI report according to the CSI reporting configuration, wherein the CSI report comprises two CSI-reference signal ("CSI-RS") resource indicators ("CRIs"), and wherein the two CRIs are represented using a single codepoint; and
transmit the CSI report.

2. The UE of claim 1, wherein a value of a field of the CSI report that corresponds to the two CRIs is the same for a plurality of CSI reports associated with one or more of the multiple TRPs.

3. The UE of claim 1, wherein a value of a field of the CSI report that corresponds to the two CRIs is included in one CSI report associated with one or more of the multiple TRPs.

4. The UE of claim 1, wherein the CSI report comprises:
two or less precoding matrix indicators ("PMIs"); and
two or less layer indicators ("LIs").

5. The UE of claim 1, wherein the CSI report comprises two Rls,
and wherein the two Rls are represented using a single codepoint.

6. The UE of claim 1, wherein the at least one processor is configured to cause the UE to determine a capability for reporting the CSI report associated with one or more of the multiple TRPs based at least in part on:
an indication that multiple TRP transmission is supported;
a number of CSI reporting settings;
a number of CSI resource settings;
a number of CSI resource sets; or
a combination thereof.

7. A method performed by a user equipment ("UE"), comprising:
receiving an indication to report channel state information ("CSI") associated with multiple transmit/receives points ("TRPs"), wherein the indication indicates a CSI reporting configuration;
generating a CSI report according to the CSI reporting configuration, wherein the CSI report comprises two CSI-reference signal ("CSI-RS") resource indicators ("CRIs"), and wherein the two CRIs are represented using a single codepoint; and
transmit the CSI report.

8. The method of claim 7, wherein a value of a field of the CSI report that corresponds to the two CRIs is the same for a plurality of CSI reports associated with one or more of the multiple TRPs.

9. The method of claim 7, wherein a value of a field of the CSI report that corresponds to the two CRIs is included in one CSI report associated with one or more of the multiple TRPs.

10. The method of claim 7, wherein the CSI report comprises:
   two or less precoding matrix indicators ("PMIs"); and
   two or less layer indicators ("LIs").

11. The method of claim 7, wherein the CSI report comprises two RIs, and wherein the two RIs are represented using a single codepoint.

12. The method of claim 7, further comprising determining a capability for reporting the CSI report associated with one or more of the multiple TRPs based at least in part on:
   an indication that multiple TRP transmission is supported;
   a number of CSI reporting settings;
   a number of CSI resource settings;
   a number of CSI resource sets; or
   a combination thereof.

13. A base station for wireless communication, comprising:
   at least one memory; and
   at least one processor coupled with the at least one memory and configured to cause the base station to:
      send an indication to report channel state information ("CSI") associated with multiple transmit/receives points ("TRPs"), wherein the indication indicates a CSI reporting configuration; and
      receive a CSI report associated with the multiple TRPs, the CSI report generated according to the CSI reporting configuration and comprising a two CSI-reference signal ("CSI-RS") resource indicators ("CRIs"), and wherein the two CRIs are represented using a single codepoint.

14. The base station of claim 13, wherein a value of a field of the CSI report that corresponds to the two CRIs is the same for a plurality of CSI reports associated with one or more of the multiple TRPs.

15. The base station of claim 13, wherein a value of a field of the CSI report that corresponds to the two CRIs is included in one CSI report associated with one or more of the multiple TRPs.

16. The base station of claim 13, wherein the CSI report comprises:
   two or less precoding matrix indicators ("PMIs"); and
   two or less layer indicators ("LIs").

17. The base station of claim 13, wherein the CSI report comprises two RIs, and wherein the two RIs are represented using a single codepoint.

18. A method performed by a base station, comprising:
   sending an indication to report channel state information ("CSI") associated with multiple transmit/receives points ("TRPs"), wherein the indication indicates a CSI reporting configuration; and
   receiving a CSI report associated with the multiple TRPs, the CSI report generated according to the CSI reporting configuration and comprising a two CSI-reference signal ("CSI-RS") resource indicators ("CRIs"), and wherein the two CRIs are represented using a single codepoint.

19. The method of claim 18, wherein a value of a field of the CSI report that corresponds to the two CRIs is the same for a plurality of CSI reports associated with one or more of the multiple TRPs.

20. The method of claim 18, wherein a value of a field of the CSI report that corresponds to the two CRIs is included in one CSI report associated with one or more of the multiple TRPs.

* * * * *